S. W. & J. F. Palmer,
Machine Gearing,
No. 2,920, Reissued Apr. 21, 1868.
Fig; 1.
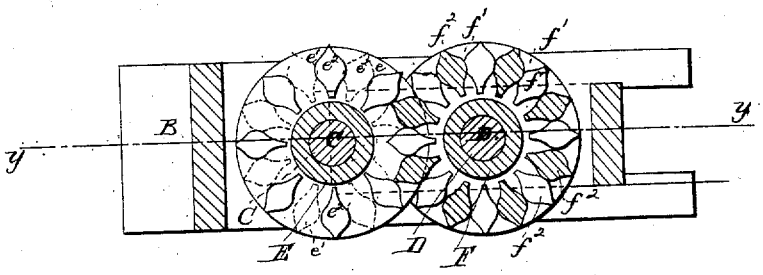
Fig; 2.
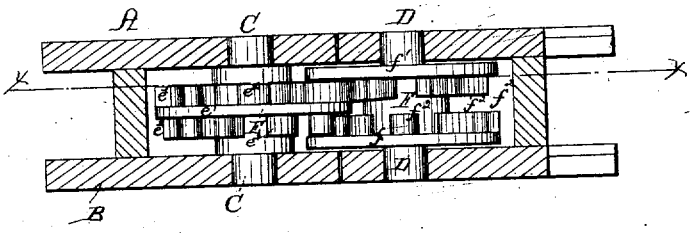
Witnesses;
J. W. Blorington
Wm. Drewrn
Inventor;
S. W. Palmer
J. F. Palmer
Per Munn & Co
Attorneys
N. PETERS, PHOTO-LITHOGRAPHER, WASHINGTON, D. C.

United States Patent Office.

THE METROPOLITAN WASHING-MACHINE COMPANY, OF MIDDLEFIELD, CONNECTICUT, ASSIGNEES OF S. W. PALMER AND J. F. PALMER, OF AUBURN, NEW YORK.

*Letters Patent No.* 54,589, *dated May* 8, 1866; *reissue No.* 2,920, *dated April* 21, 1868.

IMPROVEMENT IN GEARING.

The Schedule referred to in these Letters Patent and making part of the same.

TO WHOM IT MAY CONCERN:

Be it known that S. W. PALMER and J. F. PALMER, of Auburn, in the county of Cayuga, and State of New York, have invented certain new and useful Improvements in Gearing; and the following is hereby declared to be a full, clear, and exact description of the same, reference being had to the accompanying drawings, in which—

Figure 1 is a section of the gearing on the line *x x*, fig. 2.

Figure 2 is a section of the same on the line *y y*, fig. 1.

This invention relates to the gearing of planing-machines, clothes-wringers, and other like machines, in which the shafts or rolls are required to operate at varying distances from each other, and are liable to have a lateral play or a slipping movement in the direction of their length.

The object of this invention is to so combine and arrange the gearing as to prevent the lateral play of the shafts or rolls, which is more especially to be guarded against in clothes-wringers and like machines, where such lateral or slipping action of the rolls is apt to damage and sometimes tear the clothes.

To this end the invention consists in the combination of toothed or cogged wheels, when used in pairs upon the same shaft, with a plate or plates, arranged upon the exterior opposite or interior opposite faces of either pair, in the manner hereinafter described, whereby the wheels on the one shaft shall be held in place by the plates or disks of the wheels on the other shaft, and thus prevent the lateral play of the one shaft with respect to the other.

To enable others skilled in the art to understand and use this invention, the manner in which the same is or may be carried into effect will now be described, by reference to the accompanying drawings.

A and B represent the frame that supports the bearings in which the shafts C and D revolve. The shafts carry gear-wheels composed of circular plates or disks, $e^1 f^1 f^3$, upon the face or faces of which are formed cogs or teeth $e^2 f^2$, so as to project therefrom. The teeth upon any one of the plates, for instance, $f^1$, are arranged at equal intervals apart, and equidistant from a common centre or axis. As regards the shape of the teeth, that represented in fig. 1 is suggested as a good one, although other forms will answer the purpose. They are supported by the plate or disk with which they are united, and do not therefore depend for support upon their connection with the hub of the wheel, as is usually the case; and for this reason they may be of much greater length than ordinary cogs, thus increasing the range in which the shafts can move towards or away from each other.

The gearing represented in the drawings illustrates the manner in which a pair of gear-wheels thus formed may be united for operation upon each shaft, and upon one side of a machine, as, for instance, a clothes-wringer. The shaft C is located in the stationary portion of the frame, while the shaft D is mounted in the usual sliding box, which is capable of moving toward or away from the lower part of the frame, so as to vary the distance between the shafts. The wheels $f^1 f^3$ are mounted upon the ends of a hub, F, in such manner as to present to each other their cogged faces, while a corresponding hub, E, upon the shaft C, carries a single wheel or plate, upon each face of which are formed cogs or teeth $e^2$. The plate $e^1$ is so placed upon the shaft C that it shall penetrate or be received within the interval between the two wheels on the other shaft, and its teeth, which gear with the teeth $f^2$ of the respective wheels on the other shaft, are encased or held between the plates or disks $f^1 f^3$. By this means the wheels which compose the gearing are held in their proper relations, and all lateral or end-play of the shafts with respect to each other is prevented.

It will be seen also that the plates or disks on each of the shafts extend somewhat beyond the teeth formed upon them, and bear such relation to the hub on the other, that when the teeth $e^2 f^2$ have meshed to a certain depth, the periphery of such plates will bear upon the opposite hub, and thus prevent the clogging or jamming of the teeth, which would occur, without such precautionary measure, when the wheels were brought in close connection.

In machines such as described, it is often desirable to mount the gears which compose each pair upon the opposite ends of the same shaft, instead of upon the same end, as represented in the drawing. For instance, the wheels $f^3$ and $e^1$ may be mounted upon their respective shafts D C, on one side of the machine, while the wheel $f^1$, and one similar to $e^1$, may occupy the same relative position upon the other ends of their shafts. In such case it will, of course, be necessary for each of the wheels $e^1$ to carry no more than one set of teeth. The arrangement and position of the wheels upon the shafts with relation to each other will, however, remain substantially unchanged, no matter what distance may intervene between the wheels of the same pair, so that the wheel or plate $f^3$ will be contiguous to the exterior face of the cogs $e^2$ on one side, and the wheel or plate $f^1$ on the other side of the machine will occupy the same position with relation to the cog $e^2$ with which it gears. In like manner, the plates $e^1$ on each side will be contiguous to the interior opposite faces of the cogs $f^2$, so that the lateral play or slipping movement of one roll upon the other will be as effectually prevented as before.

Having now described this invention, what is claimed, and desired to be secured by Letters Patent, is as follows:

The combination of toothed or cogged wheels, when used in pairs upon the same shaft, with a plate or plates arranged upon the interior opposite or exterior opposite faces of either pair, in the manner described, whereby the wheels on the one shaft shall be held in place by the plate or plates of the wheels on the other shaft, and thus prevent the lateral play of the one shaft with respect to the other, as set forth.

In witness whereof, I, DAVID LYMAN, Treasurer of the Metropolitan Washing-Machine Company, acting for and in behalf of said company, have hereunto set my hand before two subscribing witnesses.

DAVID LYMAN,

*Treasurer of Metropolitan Washing-Machine Company.*

Witnesses:

WM. P. RICHARDSON,

M. BAILEY.